Sept. 8, 1959
W. F. ROLLMAN ET AL
2,903,344
ALKYLATION APPARATUS
Filed Jan. 5, 1956
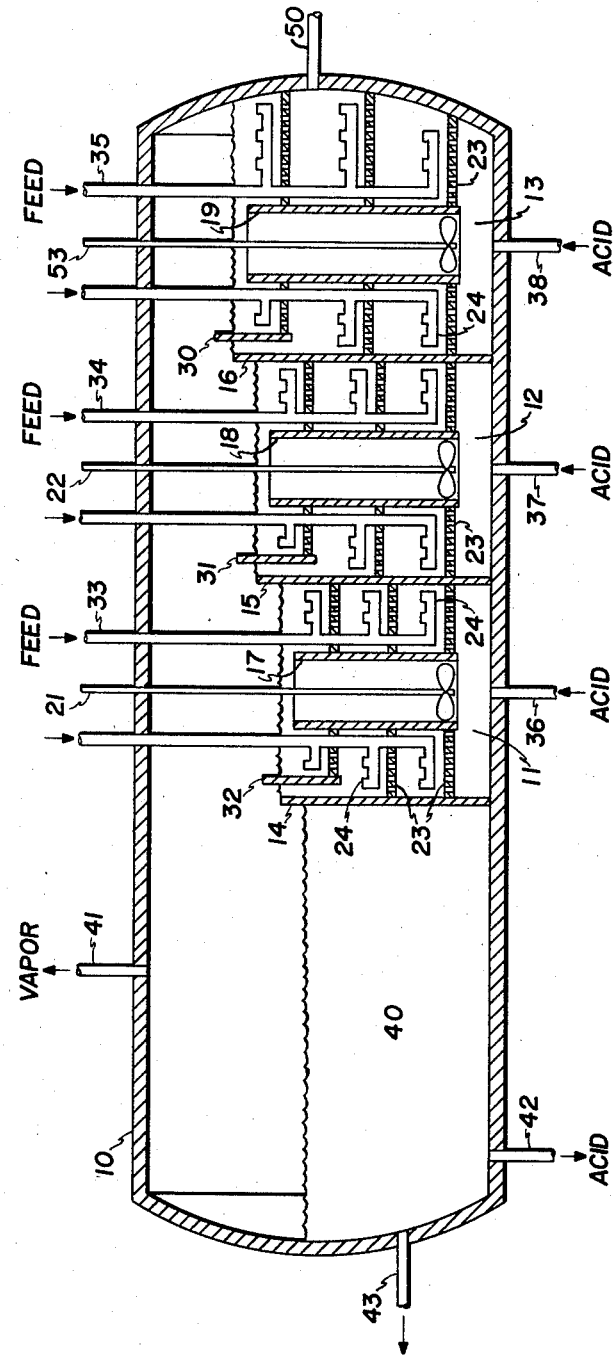
Walter F. Rollman
Donald L. Baeder
Inventors
By W. O. T Heilman Attorney

United States Patent Office 2,903,344
Patented Sept. 8, 1959

2,903,344
ALKYLATION APPARATUS

Walter F. Rollman, Millburn, and Donald L. Baeder, Fanwood, N.J., assignors to Esso Research and Engineering Company, a corporation of Delaware Application January 5, 1956, Serial No. 557,506

5 Claims. (Cl. 23—285)

The present invention is concerned with a process and apparatus for effecting reactions between hydrocarbon materials in the presence of a catalyst for the reaction. More particularly, the invention is concerned with the synthesis of hydrocarbon materials, as for example hydrocarbons having branched chain structures which are especially suitable as automobile and aviation engine fuels, or as added valuable constituents to these fuels.

This invention relates especially to means for reacting certain isoparaffin hydrocarbons with olefins to produce improved yields of branched chain paraffinic hydrocarbons boiling within the gasoline range, as in the alkylation of isobutane with butylene in the presence of sulfuric acid as a catalyst material. Although thus specifically applied, the invention contemplates the employment of any suitable hydrocarbon material including isobutane, isopentane and other paraffinic materials capable of chemical combination with olefins to obtain products of the character desired. The invention also contemplates the employment of any suitable catalyst material, in addition to sulfuric acid, such as mixtures of sulfuric and phosphoric acid. Furthermore, the invention is intended for employment under the usual or conventional range of operating conditions of temperature and pressure.

Characteristically, the olefinic materials contemplated by the present invention and capable of entering into an alkylation reaction with isoparaffinic hydrocarbons may also be polymerized by contact with the catalyst materials such as may be employed for alkylation. This characteristic is due primarily to the greater reactivity of the olefins as compared with the isoparaffins and, in order to avoid the preferential polymerization reaction, or at least to reduce it to a minimum when alkylation is desired, various process expedients have been employed. A most conventional procedure to inhibit concurrent polymerization as well as to prevent other undesirable secondary or side reactions has been to effect catalytic alkylation reactions under conditions designed to avoid intimate contact of the olefins with the catalyst material in the comparative absence of isoparaffins. To accomplish this, it has been customary to provide a substantial excess of isoparaffins in the reaction zone or to dilute the olefin material with a material containing a substantially greater amount of isoparaffins prior to introduction into the reaction zone. For example, the olefin material may be introduced in successive increments in a continuous series of reaction zones or stages containing previously emulsified and contacted materials. Under such procedures, it is frequently difficult to adequately control the quantities of the various materials introduced, or their relative proportions in any stage, and also the degree of emulsification or mixing which is accomplished from stage to stage. As a result, there may be areas in any particular zone or stage in which the olefins may come in contact with substantially unemulsified or free catalyst materials to produce the undesired polymerization or other side reactions, and thereby to reduce the yield of alkylation products.

In accordance with the present invention, alkylation of isoparaffins with olefins is carried out in a staged type reactor wherein improved operating results are secured by the introduction of the feed at selected multiple feed injection points. The process and apparatus of the present invention may be readily appreciated by reference to the drawing illustrating one embodiment of the same.

Referring specifically to the drawing, numeral 10 designates a reaction vessel. This vessel may be of any suitable proportions as required by the volume of process materials to be handled and by the residence time required for the reaction to be carried out therein. In a typical alkylation reaction, the time of residence of hydrocarbons in the reaction zone may vary from about 15 to 120 minutes.

The system as illustrated is suitable for employment under any circumstances in which two or more immiscible materials of different specific gravities are to be contacted, and is particularly useful under circumstances in which such contact is made for the purpose of accomplishing a chemical reaction involving the materials, and in which the reactants and the reaction products may be separated from the catalyst material by gravity and in which the products of the reaction may be removed from any excess of reactant materials by fractionation. More specifically, the system is particularly adapted for employment in the alkylation of isoparaffins with an olefin, in the presence of a liquid active acid catalyst material such as concentrated sulfuric acid. For example, the system is suitable for the alkylation of isobutane and butylene in the presence of sulfuric acid having the strength of from about 90 to about 98%, in which the alkylation reaction is carried out at a temperature of from about 30° to about 60° F. In such a reaction, it is desirable that the isobutane be present in the reactant materials in an amount considerably in excess of the butylene in order to insure optimum utilization of the latter material. It is also desirable that the operation provide against uncontrolled polymerization of the butylene component.

In a typical operation, isoparaffins and olefins may be introduced into the system in such proportions as to result in a total feed in which the several components are present substantially as follows:

| Component: | Vol. percent total feed |
|---|---|
| Propane | 3 |
| Butylene | 15 |
| Isobutane | 70 |
| Normal butane | 12 |

Normally, the olefin material initially fed into the system may be supplied by a composition substantially as follows:

| Component: | Vol. percent olefin feed |
|---|---|
| Propane | 1 |
| Butylene | 40 |
| Isobutane | 47 |
| N-butane | 12 |

In order to achieve the desired proportions of butylene to isobutane in the reaction mixture, therefore, additional isobutane must be made available from some other source. A suitable feed material may be obtained by recycling unreacted isobutane as later described. This material may have a composition substantially as follows:

| Component: | Vol. percent isoparaffin feed |
|---|---|
| Propane | 3 |
| Isobutane | 85 |
| N-butane | 12 |

In the process and apparatus as illustrated, reaction vessel 10 contains three circulating reaction stages, namely, 11, 12 and 13. These stages are formed by vertical baffle elements 14, 15 and 16. The height of baffle element 14 is somewhat less than that of baffle element 15 which in turn is somewhat less than that of baffle element 16.

Positioned within each of the respective stages are draft tube cylindrical elements 17, 18 and 19. These draft tube elements may be positioned by any suitable means (not shown) at a desired distance above the bottom of reaction vessel 10. The top of draft tube element 17 is below the top of baffle 14, while the top of element 18 is below that of baffle 15. The height of cylindrical element 19 is below the height of baffle or wall element 16.

Positioned within draft tube elements 17, 18 and 19 are stirrers 21, 22 and 53, respectively. These stirrers may be driven by any suitable means. The bottom of each stirrer is at the lower end of each draft tube element.

In accordance with the present invention, the respective circulating emulsion stages 11, 12 and 13 contain multiple feed injection points and orifice plate elements as illustrated in stage 11. Referring specifically to stage 11, orifice plates 23 are alternately positioned with feed injection points 24 in the area between the draft tube 17 and the baffles 14 and 15, forming stage 11. Since each orifice plate has a plurality of openings, the emulsion in passing through the plate will be broken up into a plurality of separate streams before it contacts the olefin feed. Thus, very excellent mixing of the emulsion with the olefin feed is secured at a plurality of points in the respective stages.

In operation, an isoparaffin feed stream is introduced into the initial zone 13 by means of line 50. Impeller 53 is activated to secure a circulatory motion downwardly within draft tube 19 and upwardly in the space between the draft tube, the sides of the vessel and plate 16. The liquid flows upwardly in that space and passes through a plurality of superimposed orifice plates 23. Olefin feed is introduced by means of line 35 through a plurality of nozzle elements 24 interspaced between the pierced plate elements 23. Acid may be introduced with the feed through line 50, but is preferably introduced through line 38.

Liquid from zone 13 over-flows plate 16 through the passage formed by plate element 30 and plate element 16. Zone 12 operates in a manner similar to that described with respect to zone 13. Stirrer 22 causes liquid to flow upwardly through pierced plate elements 23. Olefin feed is introduced at a plurality of points by orifice means. Zone 11 operates in a manner similar to that described with respect to zone 12 and 13. Stirrer 21 causes the liquid to flow downwardly within element 17 and upwardly in the space within zone 14, exterior of element 17, through plate elements 23. Olefin feed is introduced at a plurality of points through nozzle elements 24.

Vaporized material is withdrawn from the system by means of line 41. A settling stage 40 is provided from which spent acid may be withdrawn through line 42, while the product is removed by line 43 and handled in a manner to separate the various constituents. Recycling of the emulsion may be used if desired.

By providing the pierced plate elements and the plurality of olefin feed injection points, a higher quality alkylate is secured. It is preferred that the olefin feed be introduced into each separate stage and that two, preferably, three sets of feed points be used as the liquid flows upwardly in the area between the wall of the zone and the downflow tube element.

What is claimed is:

1. An apparatus for effecting emulsion contacting of hydrocarbons and a liquid acid catalyst which comprises a vessel including walls defining a reaction stage, a draft tube vertically disposed within said reaction stage and spaced from the said walls, stirring means within said draft tube adapted to circulate fluid vertically in one direction through said draft tube, at least one multiple opening orifice plate positioned within the vertical space between said draft tube and said walls, at least one nozzle element within said last named spaced adjacent said orifice plate with the opening of said nozzle directed vertically away from said orifice plate, and means for directing an olefin feed through said nozzle, whereby an emulsion of hydrocarbons and liquid acid catalyst may be circulated in one vertical direction through said draft tube and in the opposite direction through said vertical space, passing through said orifice plate and thereby dividing into a plurality of separate vertical streams immediately before coming into contact with the olefin feed issuing from said nozzle, thus effecting improved contact between emulsion and olefin feed.

2. Apparatus as defined by claim 1 wherein a plurality of vertically spaced orifice plates are provided, and including at least one olefin feed nozzle element vertically adjacent each said orifice plate.

3. An apparatus for effecting emulsion contacting of hydrocarbons and a liquid acid catalyst which comprises a horizontally disposed vessel having an inlet at one end of said vessel and an outlet at the opposite end, a plurality of vertical baffle elements within said vessel defining therein a plurality of laterally spaced reaction stages, said baffles increasing in height in the direction of said inlet, a draft tube vertically disposed within each reaction stage and spaced from the said baffles and the walls of the vessel, the top edge of the draft tube being lower than the top edge of any baffle defining its reaction stage, stirring means within each draft tube adapted to circulate fluid vertically in one direction through the draft tube, at least one multiple opening orifice plate positioned within each reaction stage in the vertical space between said draft tube and the walls and baffles defining said reaction stage, at least one nozzle element positioned within said vertical space adjacent said orifice plate with the opening of said nozzle directed vertically away from said orifice plate, and means for directing an olefin feed through said nozzle, whereby within each reaction stage an emulsion of hydrocarbons and liquid acid catalyst may be circulated in one vertical direction through said draft tube and in the opposite direction through said vertical space, passing through said orifice plate and thereby dividing into a plurality of separate vertical streams immediately before coming into contact with the olefin feed issuing from said nozzle, thus effecting improved contact between emulsion and olefin feed, a portion of the emulsion passing successively from stage to stage over said baffles toward said outlet.

4. Apparatus as defined by claim 3 wherein a plurality of vertically spaced orifice plates are provided in each reaction stage, and including at least one olefin feed nozzle element vertically adjacent each said orifice plate.

5. Apparatus as defined by claim 3 wherein each of said stirring means is adapted to circulate fluid downwardly within each of said draft tube elements.

References Cited in the file of this patent

UNITED STATES PATENTS

| | | |
|---|---|---|
| 2,373,888 | Hachmuth | Apr. 17, 1945 |
| 2,386,681 | Hadden | Oct. 9, 1945 |
| 2,429,205 | Jenny et al. | Oct. 21, 1947 |
| 2,454,869 | Goldsby et al. | Nov. 30, 1948 |
| 2,485,276 | Gerbes | Oct. 18, 1949 |
| 2,488,190 | Hepp | Nov. 15, 1949 |
| 2,701,184 | Rupp | Feb. 1, 1955 |
| 2,751,425 | Rupp | June 19, 1956 |